(12) United States Patent
Sohn

(10) Patent No.: US 8,215,863 B2
(45) Date of Patent: Jul. 10, 2012

(54) CONNECTOR FOR STICK

(76) Inventor: Dae Up Sohn, Seoul (KR)

( * ) Notice: Subject to any disclaimer, the term of this patent is extended or adjusted under 35 U.S.C. 154(b) by 0 days.

(21) Appl. No.: 13/164,355

(22) Filed: Jun. 20, 2011

(65) Prior Publication Data

US 2011/0243647 A1 Oct. 6, 2011

Related U.S. Application Data

(62) Division of application No. 12/517,861, filed as application No. PCT/KR2007/006271 on Dec. 5, 2007.

(30) Foreign Application Priority Data

| Dec. 5, 2006 | (KR) | 10-2006-0122285 |
| Dec. 28, 2006 | (KR) | 10-2006-0135853 |

(51) Int. Cl.
*F16B 7/14* (2006.01)
*A45B 5/00* (2006.01)

(52) U.S. Cl. ............ 403/109.5; 403/109.7; 403/370; 403/371; 135/75

(58) Field of Classification Search .......... 403/368, 403/370, 371, 109.1–109.5, 109.7; 135/75
See application file for complete search history.

(56) References Cited

U.S. PATENT DOCUMENTS

| 2,490,369 | A | * | 12/1949 | Neuwirth | 248/188.5 |
| 2,972,495 | A | * | 2/1961 | Yalen | 403/176 |
| 3,004,743 | A | * | 10/1961 | Wenger | 248/161 |
| 4,134,703 | A | * | 1/1979 | Hinners | 403/104 |
| 4,238,164 | A | * | 12/1980 | Mazzolla | 403/109.5 |
| 5,263,802 | A | * | 11/1993 | Fichot et al. | 411/26 |
| 5,803,643 | A | * | 9/1998 | Patelli et al. | 403/109.1 |
| 5,876,147 | A | * | 3/1999 | Longo | 403/109.5 |
| 6,027,087 | A | * | 2/2000 | Lindemann et al. | 248/188.5 |
| 6,302,614 | B1 | * | 10/2001 | Tseng | 403/109.5 |
| 6,516,821 | B1 | * | 2/2003 | Uemura | 135/75 |
| 6,745,909 | B1 | * | 6/2004 | Lai | 211/206 |
| RE38,635 | E | * | 10/2004 | Uemura | 135/69 |
| 7,422,526 | B2 | * | 9/2008 | Nemeckay | 473/296 |
| 2006/0204322 | A1 | * | 9/2006 | Roiser | 403/109.5 |
| 2010/0310306 | A1 | * | 12/2010 | Wright | 403/109.1 |

* cited by examiner

*Primary Examiner* — Joshua Kennedy
(74) *Attorney, Agent, or Firm* — Kile Park Goekjian Reed & McManus PLLC

(57) ABSTRACT

A locking mechanism includes a support rod, inserted into a first unit shaft at a first end thereof and locked to a second unit shaft at a second end thereof, with threads formed around the outer circumferential surface thereof; and a pressure locking unit movably engaged with the threads of the support rod and having longitudinal slits formed to open in one direction and at least two pressure parts formed in a longitudinal direction. The locking pressure of the pressure locking unit is imposed on the unit shafts at multiple longitudinally spaced points, thus dispersing or distributing the locking strength in the longitudinal direction and increasing both the locking strength and the resistance against both longitudinal compressive force and longitudinal tensile force, thereby preventing the locked unit shafts from suddenly slipping towards each other.

1 Claim, 14 Drawing Sheets

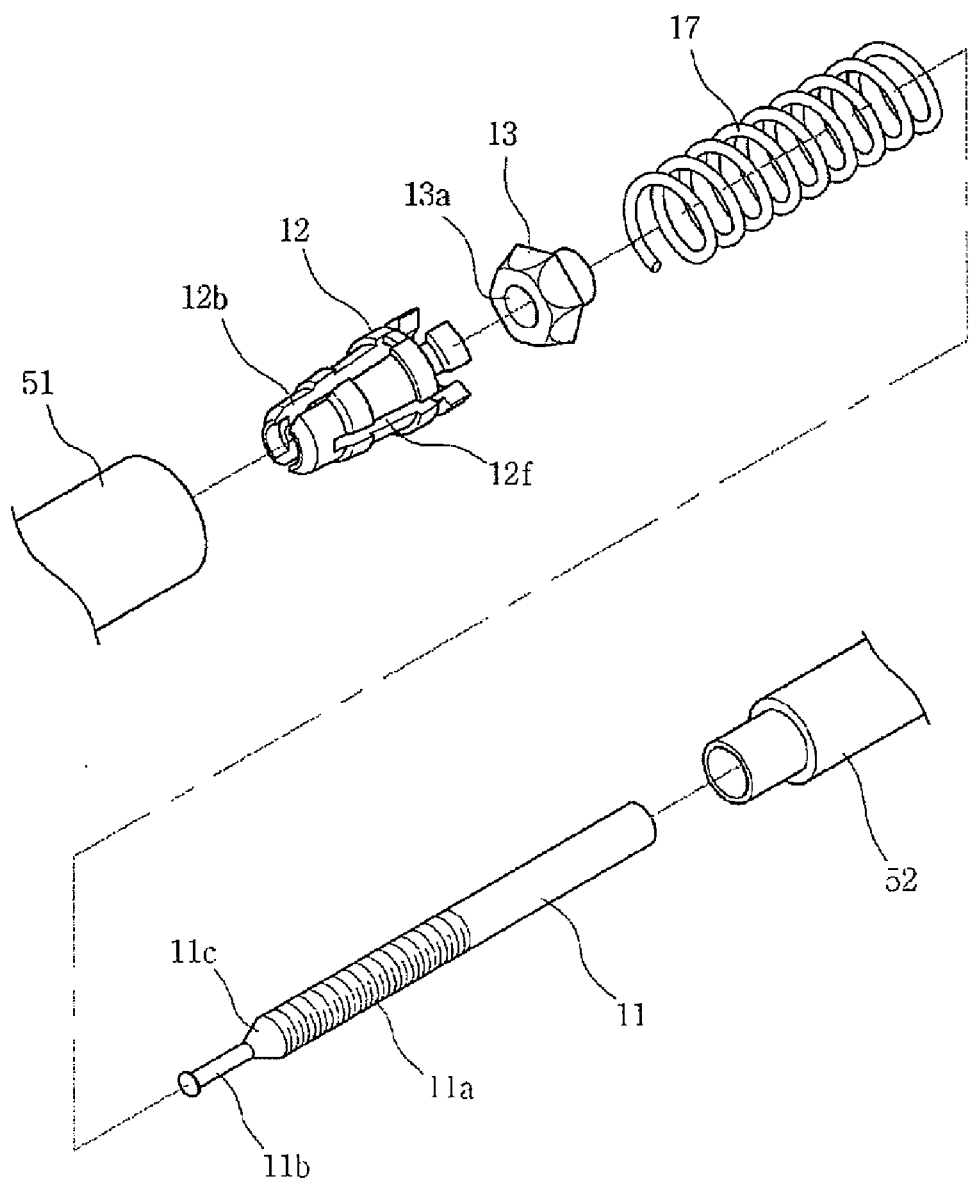
[Fig. 1]

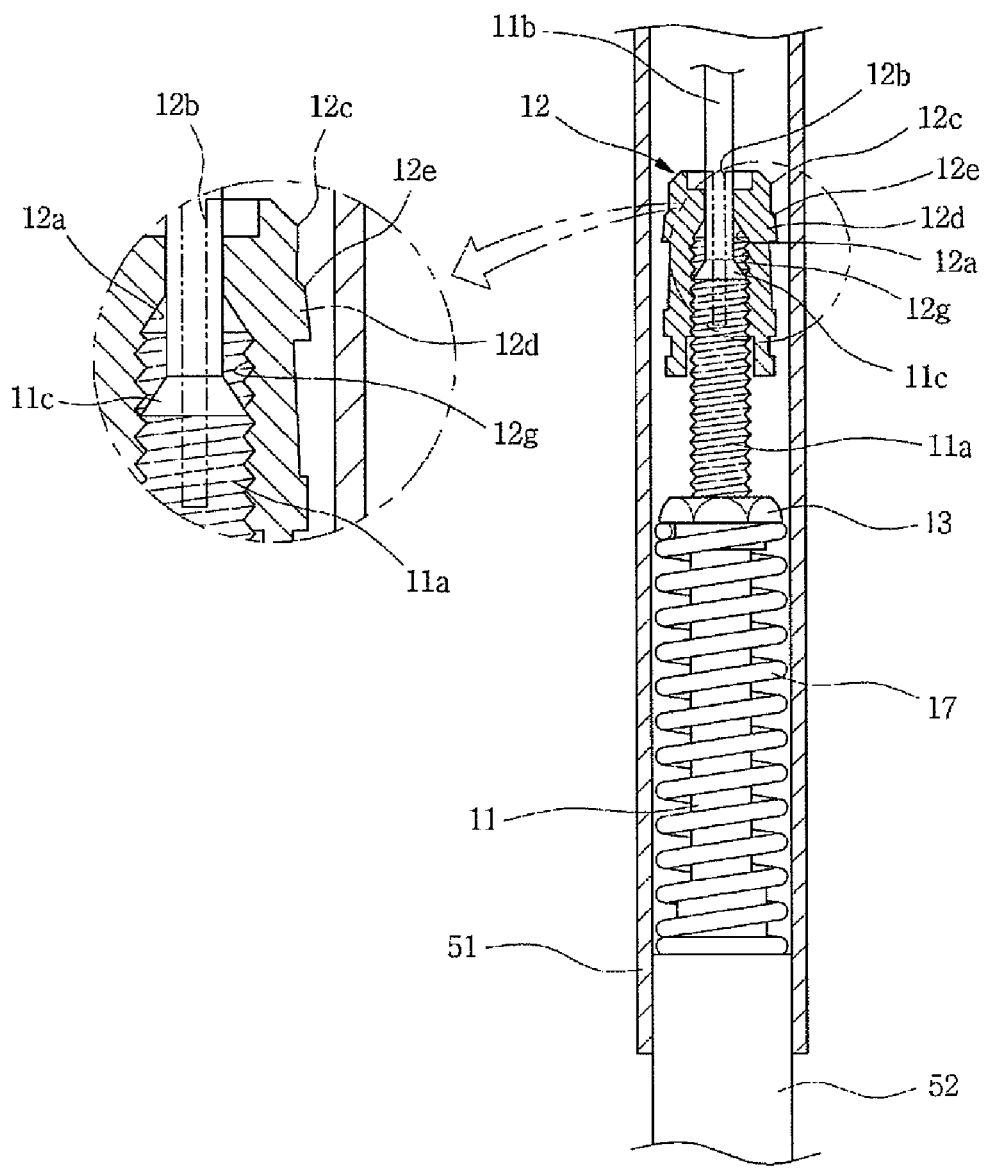
[Fig. 2]

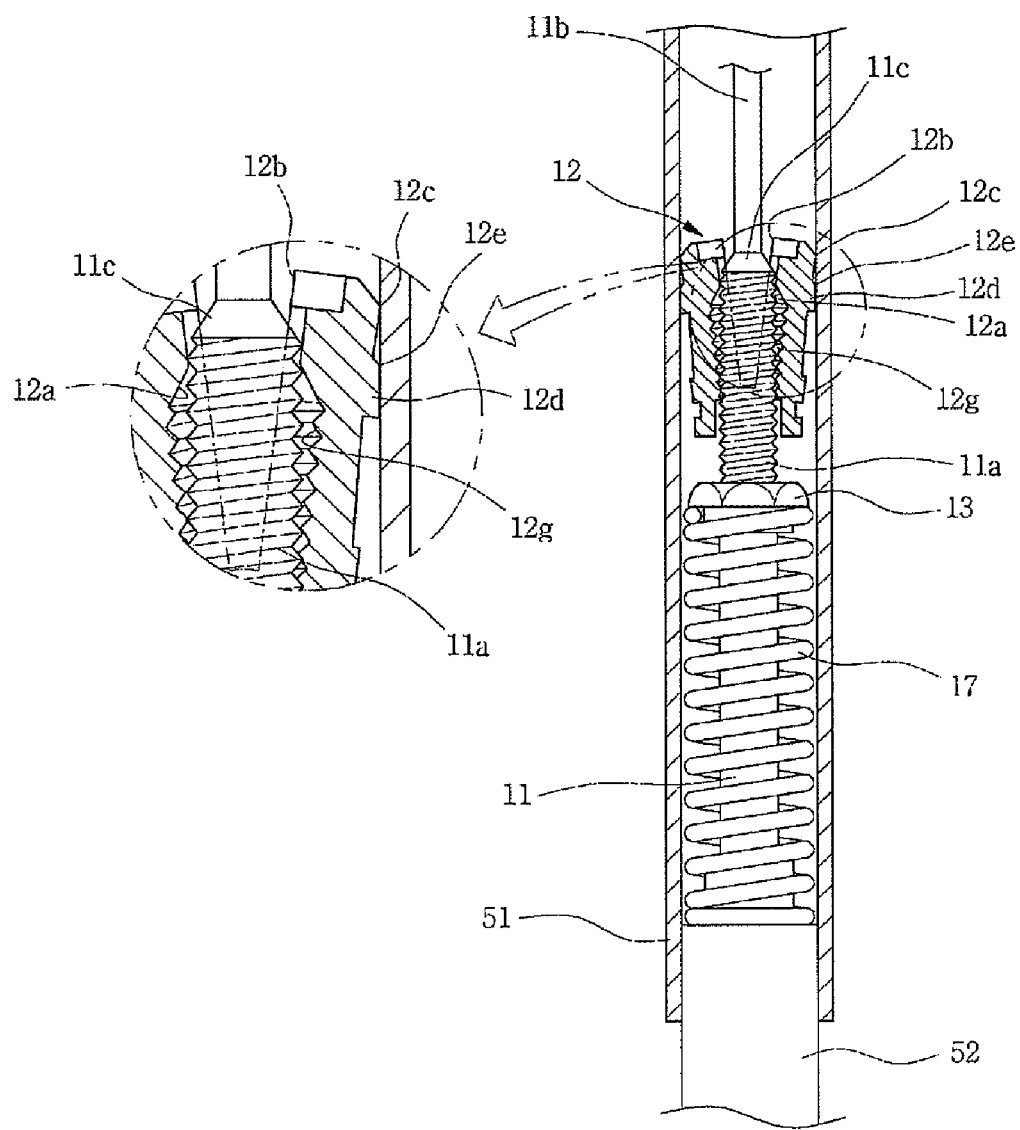
[Fig. 3]

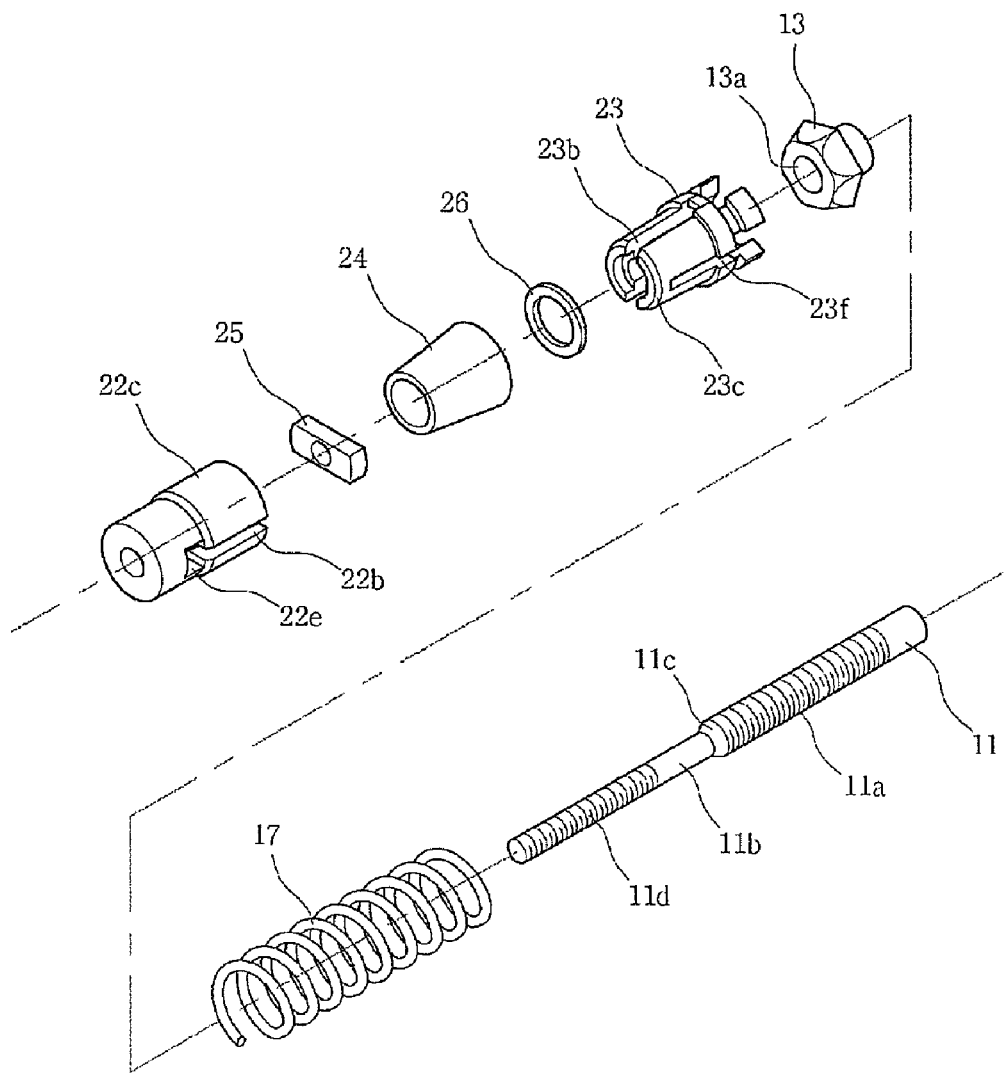
[Fig. 4]

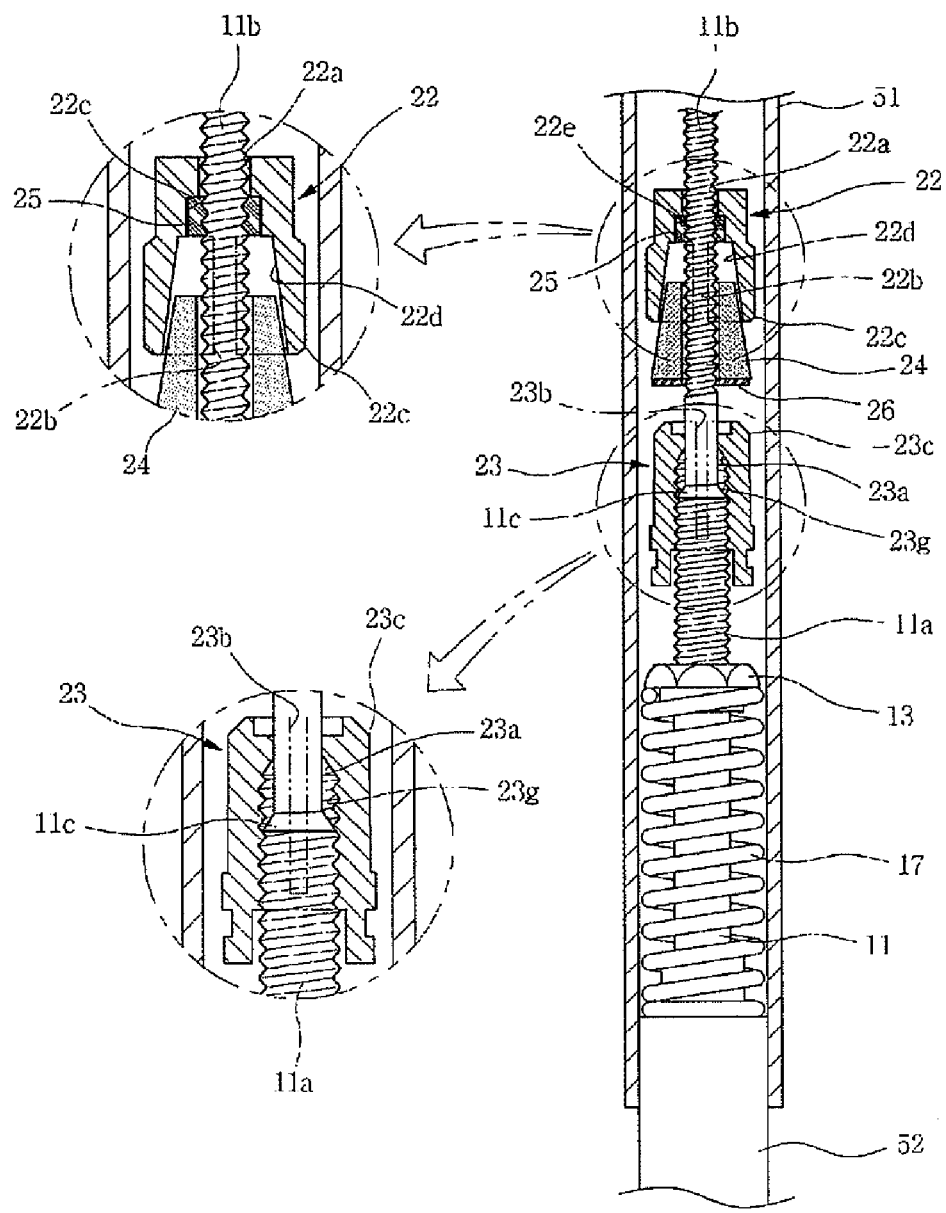
[Fig. 5]

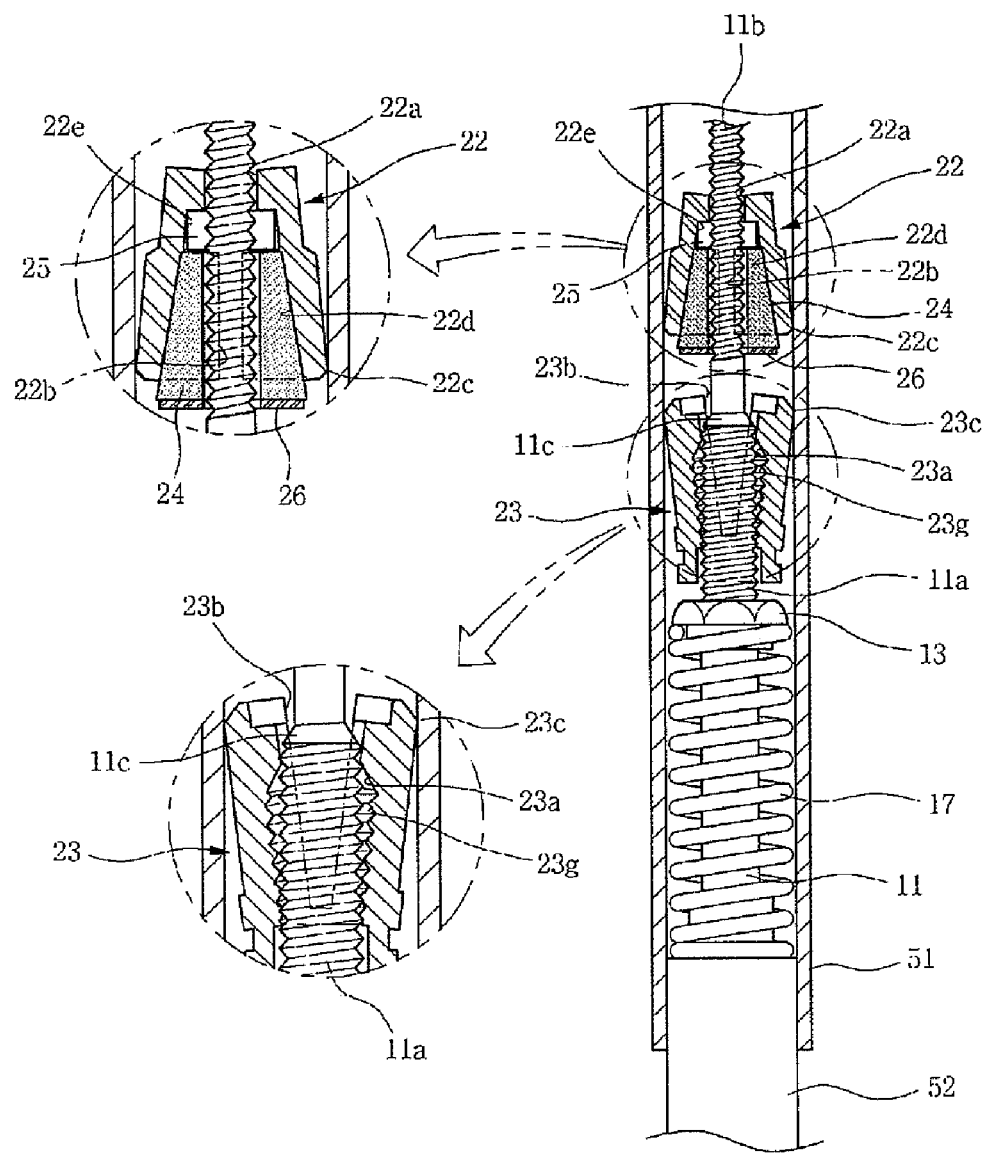
[Fig. 6]

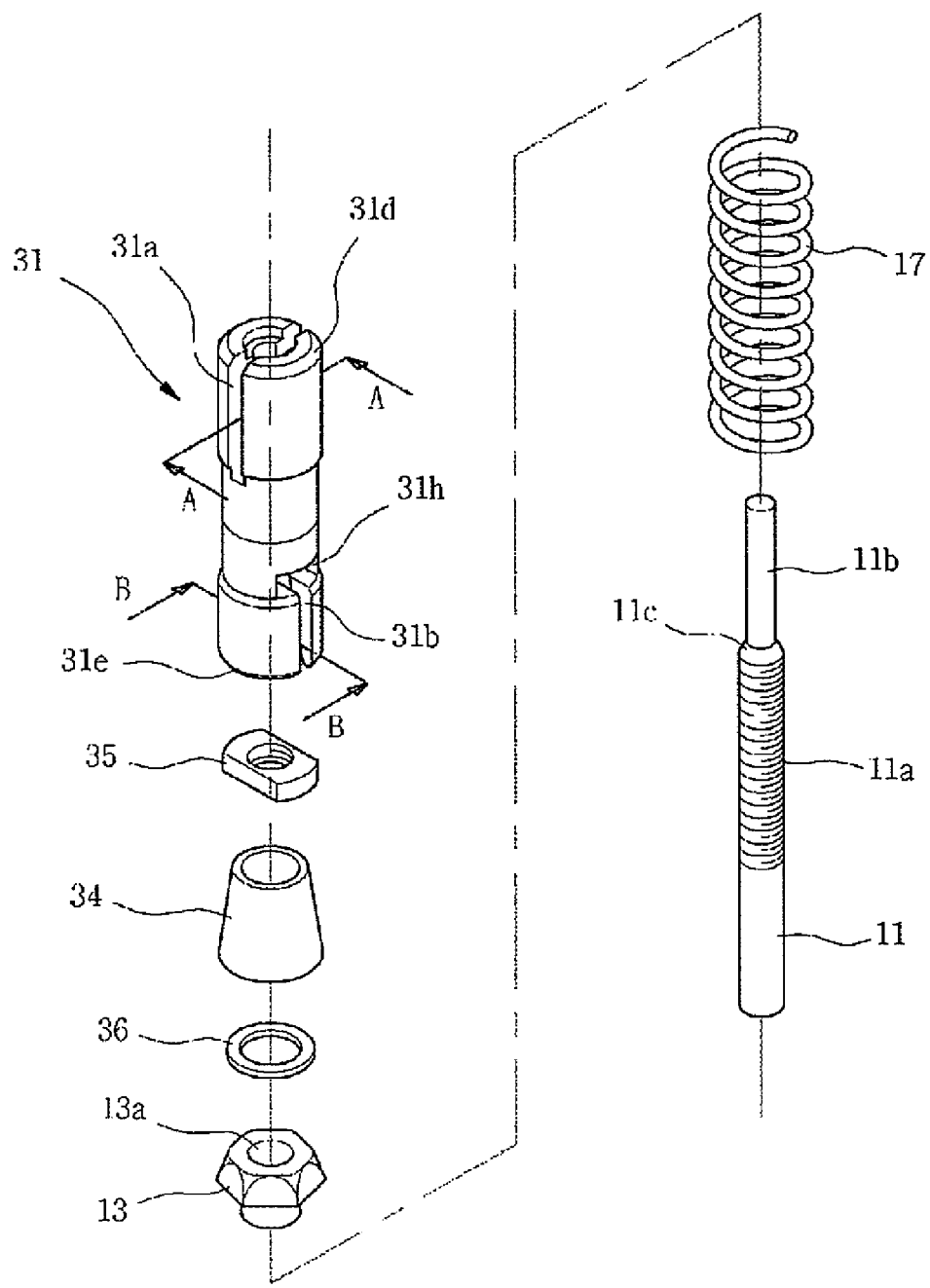
[Fig. 7]

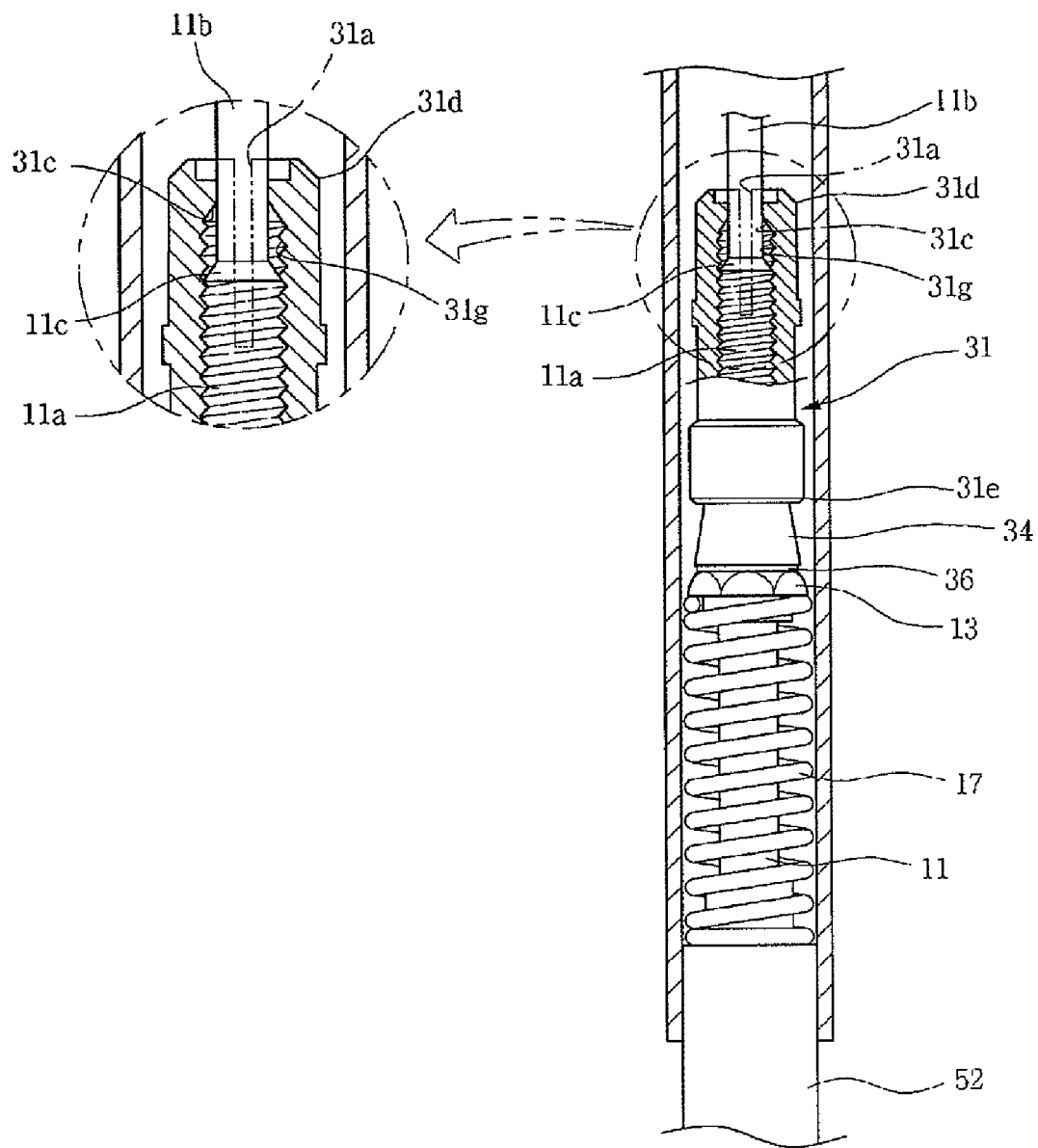
[Fig. 8]

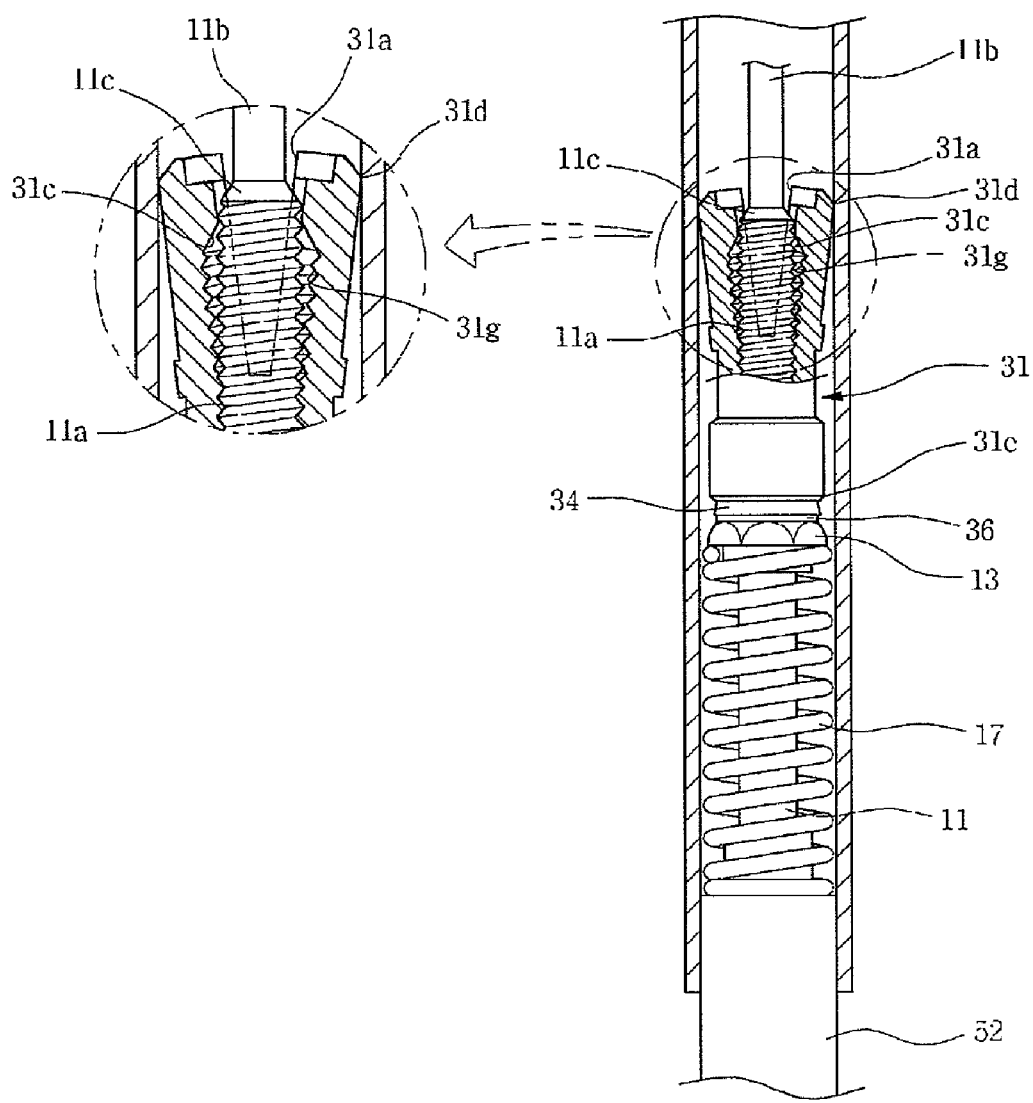
[Fig. 9]

[Fig. 10]
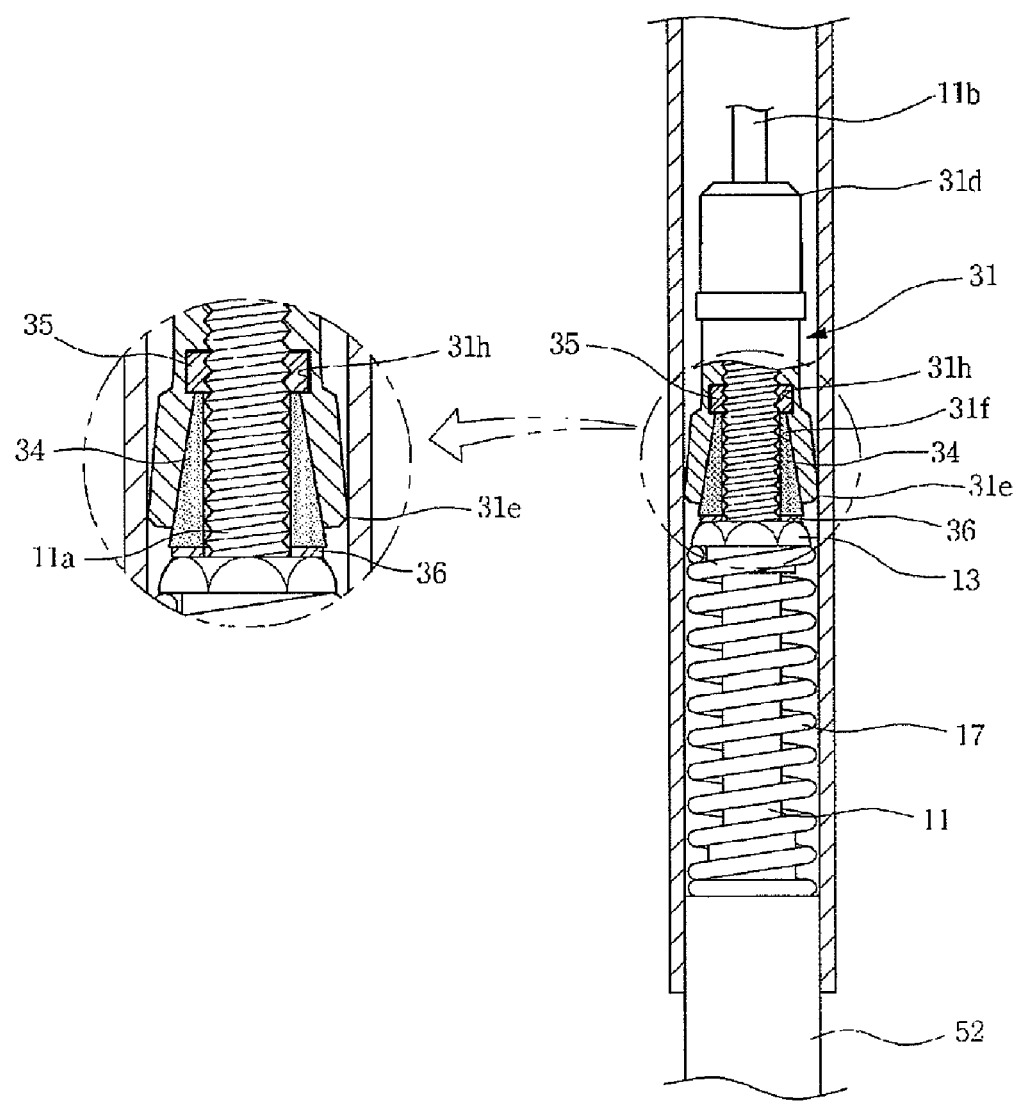

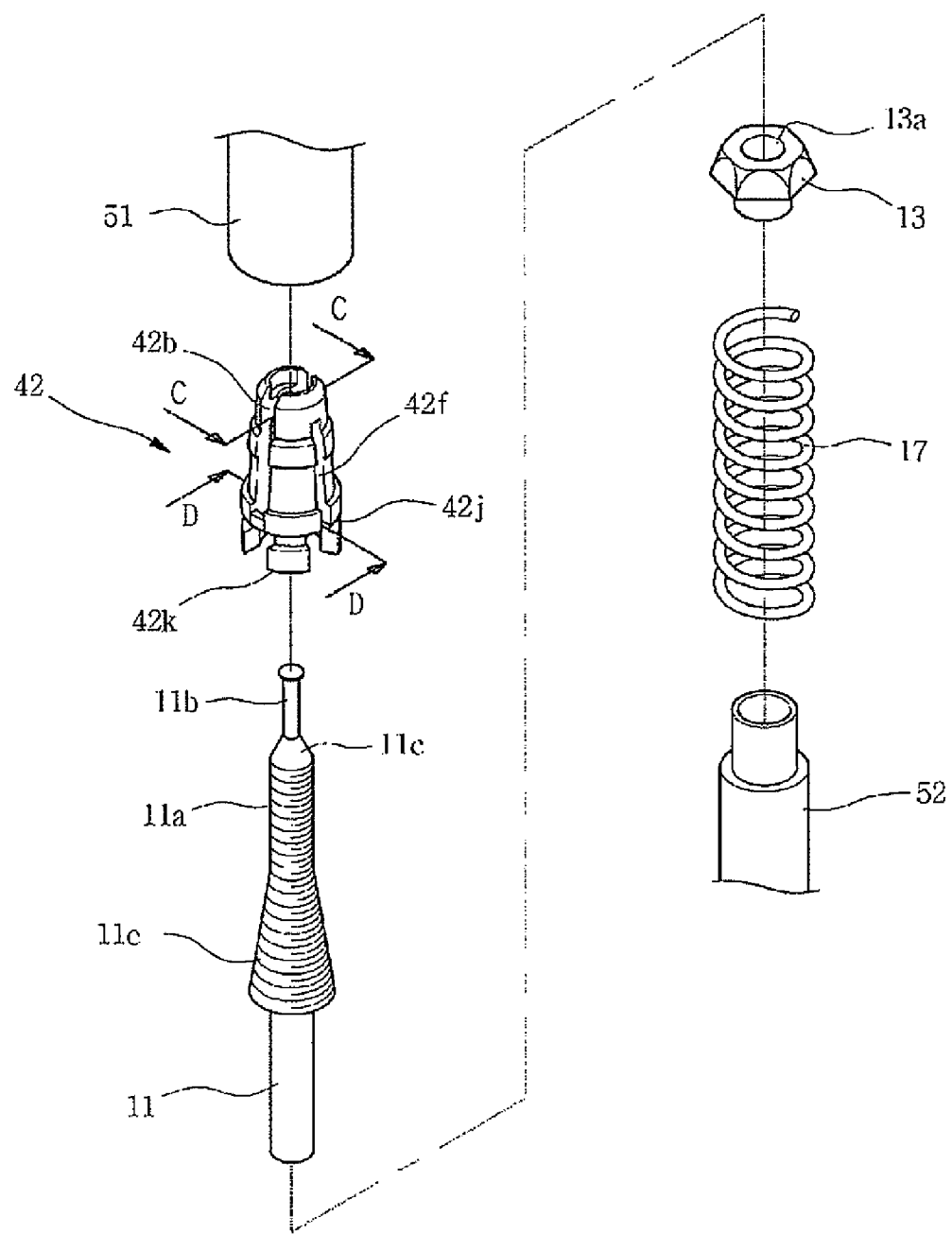
[Fig. 11]

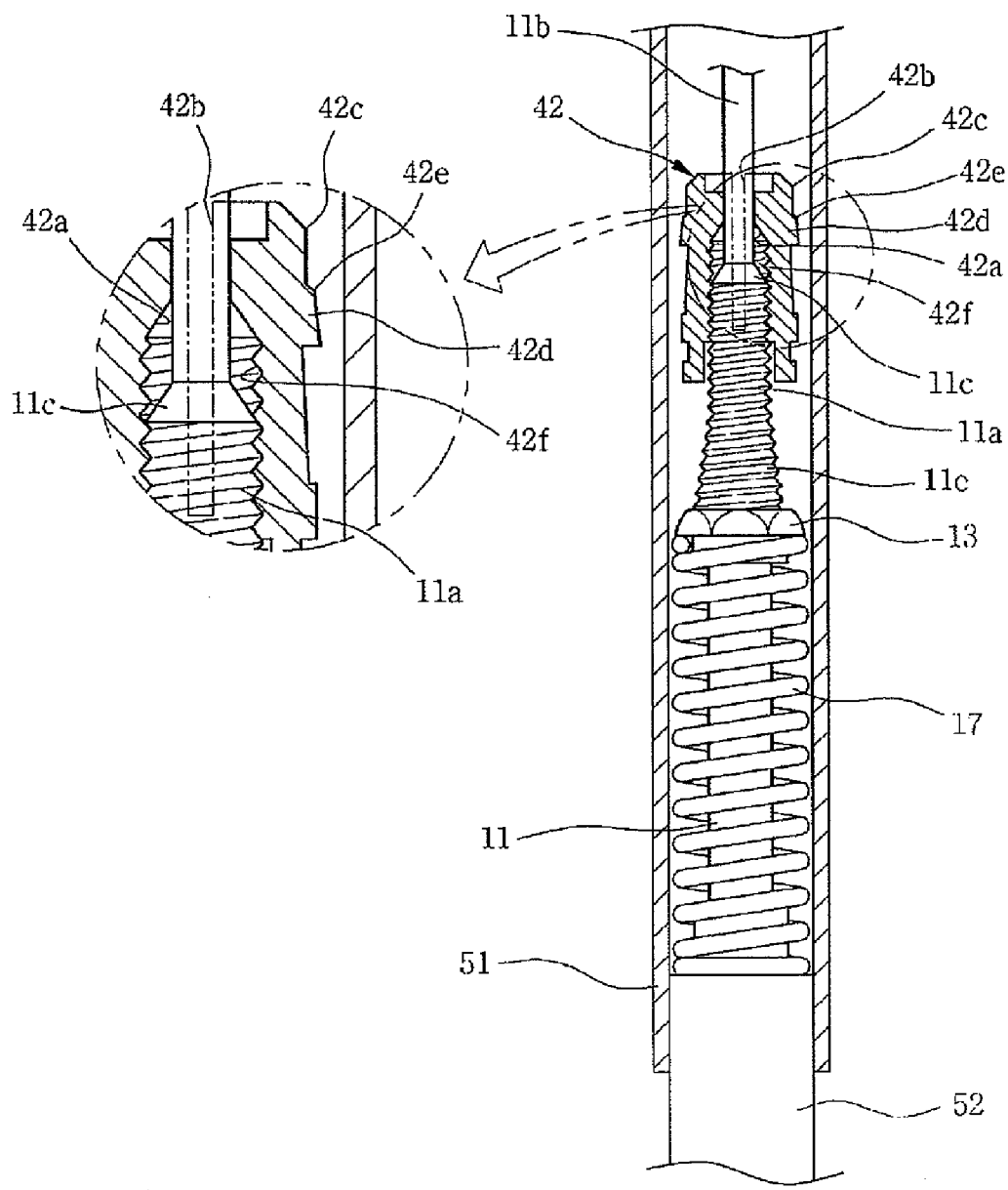
[Fig. 12]

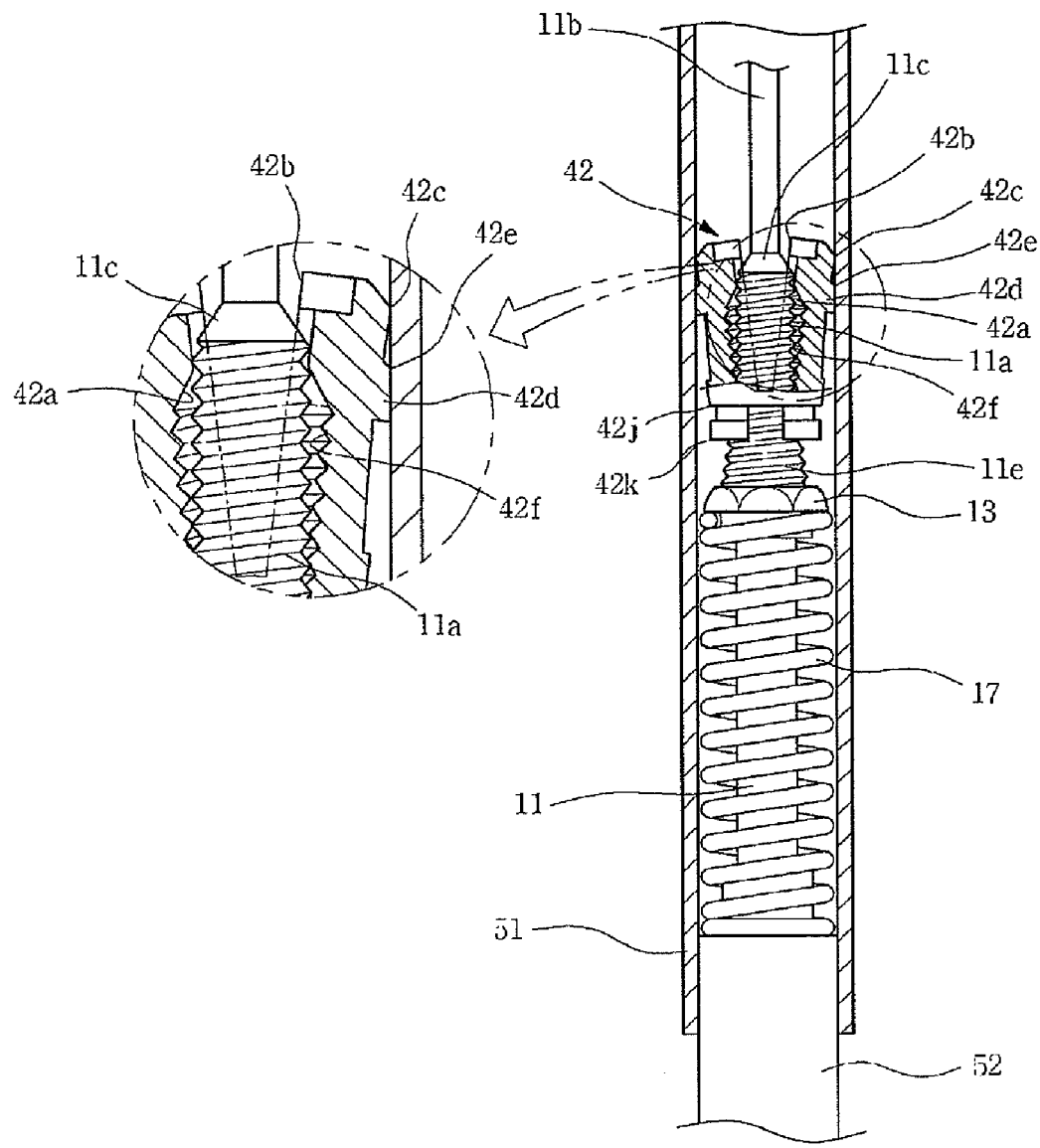
[Fig. 13]

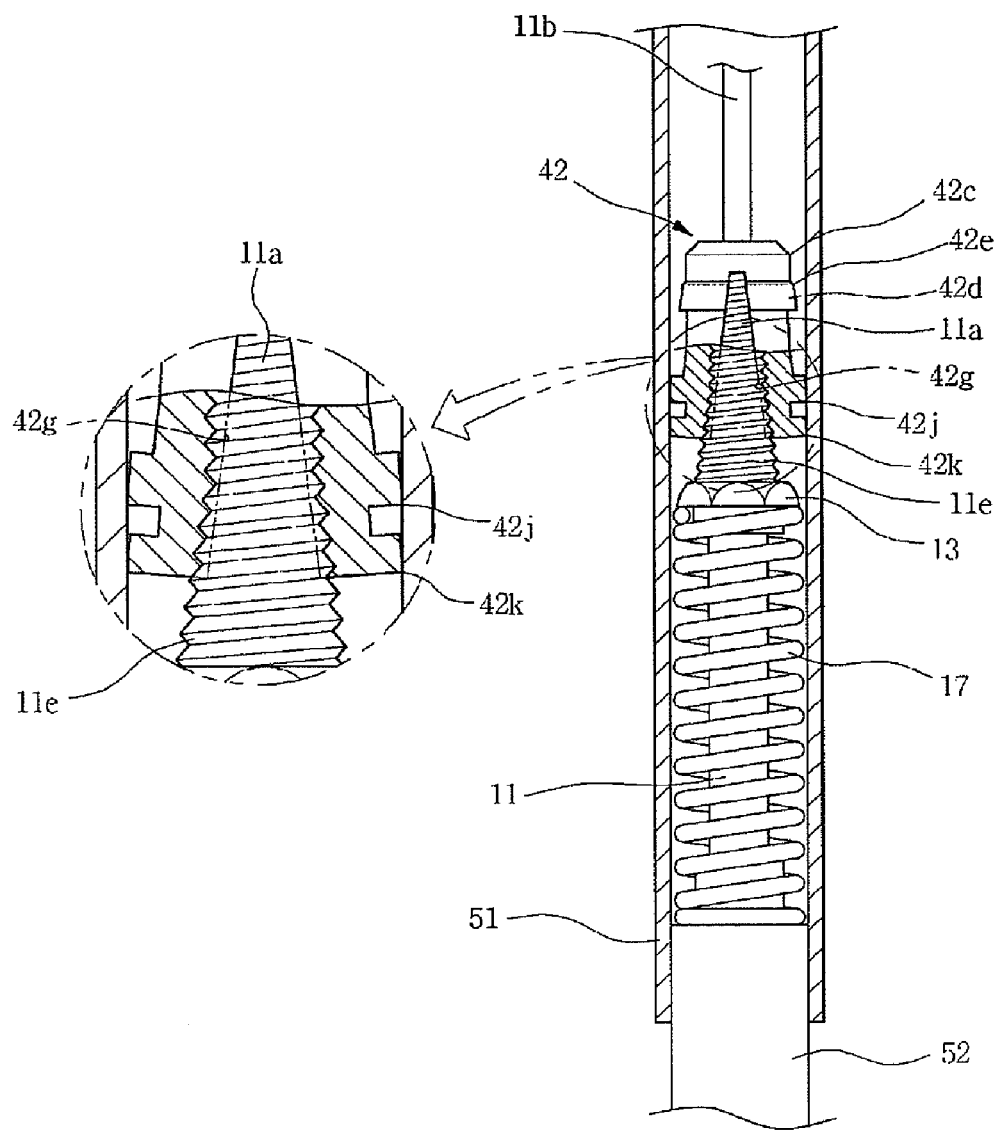

CONNECTOR FOR STICK

This application is a divisional application of U.S. patent application Ser. No. 12/517,861, filed Jun. 5, 2009, which claims priority to PCT Application No. PCT/KR2007/006271, filed on Dec. 5, 2007, and Korean Patent Applications 10-2006-0122285 and 10-2006-0135853 filed Dec. 5, 2006 and Dec. 28, 2006, respectively, the entire contents of which are incorporated herein by reference.

TECHNICAL FIELD

The present invention relates, in general, to locking mechanisms for poles and, more particularly, to a locking mechanism for poles, which releasably locks a plurality of unit shafts of a pole to each other.

BACKGROUND ART

Generally, poles are long thin pieces that may be used for various purposes, such as walking sticks for hiking or trekking or support poles for tents.

Such poles are typically used by aged people, physically handicapped people, hikers and trekkers. Further, poles may be used as a symbol of dignity or for self-protection by some people. Thus, such poles may be called walking sticks, staffs or canes.

In recent years, the structures of poles have been developed such that the poles comprise a plurality of assemblable unit shafts instead of an integrated single shaft having a fixed length. Thus, the assemblable poles proposed in recent years can be conveniently stored when not used and the lengths thereof can be easily adjusted as desired.

The conventional poles having the assemblable structures are configured to realize locking between neighboring unit shafts thereof on one surface (that is, one surface locking), so that the poles can somewhat efficiently resist compressive force. However, when tensile force is applied to the pole by pulling two locked unit shafts from each other in opposite directions, both the frictional force and the locking strength between the two locked unit shafts are reduced, so that slippage may occur between the two locked unit shafts and the locked state between the two unit shafts may be released, thus sometimes subjecting users to safety hazards.

BRIEF SUMMARY OF THE INVENTION

Accordingly, the present invention has been made keeping in mind the above problems occurring in the related art, and is intended to provide a locking mechanism for poles, which increases the locking strength of locked unit shafts of a pole, thus realizing improved utility and improved quality of the poles.

In order to accomplish the above object, the present invention provides a locking mechanism for poles, comprising: a support rod inserted into a first unit shaft at a first end thereof and locked to a second unit shaft at a second end thereof, with threads formed around part of an outer circumferential surface of the support rod; and a pressure locking unit movably engaged with the threads of the support rod through screw-type engagement, with at least one pair of longitudinal slits formed in the pressure locking body such that the slits are open in one direction, and with two or more pressure parts formed in the pressure locking body in a longitudinal direction.

In an aspect, the pressure locking unit may comprise a pressure locking body, the pressure locking body comprising: an annular-shaped first pressure part provided around an edge of a first end of the pressure locking body; and an annular-shaped second pressure part formed by a pressure protrusion formed around an outer circumferential surface of the pressure locking body, and the support rod may comprise a tapered shoulder part at a predetermined location near the threads, wherein the pressure locking body is provided on an inner circumferential surface thereof with a tapered seat part so as to correspond to the tapered shoulder part of the support rod.

In another aspect, the pressure locking unit may comprise a pressure locking body having a pair of first slits and a pair of second slits, which are formed in the pressure locking body such that the first and second slits are angularly spaced apart from each other at right angles, wherein the pressure locking body comprises: an annular-shaped first pressure part formed around a first edge of the pressure locking body and an annular-shaped second pressure part spaced apart from the first pressure part; and an annular-shaped third pressure part formed around a second edge of the pressure locking body and an annular-shaped fourth pressure part spaced apart from the third pressure part, wherein the first and second slits are opened in opposite directions, the support rod is provided both with a first tapered shoulder part at a location near a first end of the threads and with a second tapered shoulder part at a location near a second end of the threads, and the pressure locking body is provided on an inner circumferential surface thereof with a tapered seat part so as to correspond to the first tapered shoulder part of the support rod.

In a further aspect, the pressure locking unit may comprise: a first pressure locking body having both at least one pair of slits and an annular-shaped first pressure part formed around an edge of the first pressure locking body; and a second pressure locking body having both at least one pair of slits and an annular-shaped second pressure part formed around an edge of the second pressure locking body.

In yet another aspect, the support rod may comprise: first threads formed around an outer circumferential surface of the support rod; a tapered shoulder part formed around the support rod at a location above the first threads; and second threads formed around the support rod at a location above the tapered shoulder part and having a diameter less than that of the first threads, wherein the first pressure locking body is movably engaged with the second threads of the support rod through screw-type engagement, the support rod is provided on the second threads with a wedge part having a tapered outer circumferential surface, the first pressure locking body is provided on an inner circumferential surface thereof with a first tapered seat part so as to correspond to the tapered outer circumferential surface of the wedge part, and the second pressure locking body is movably engaged with the first threads of the support rod through a screw-type engagement, and is provided on an inner circumferential surface thereof with a second tapered seat part so as to correspond to the tapered shoulder part of the support rod.

In still another aspect, the pressure locking unit may comprise a pressure locking body, with at least one pair of first slits and at least one pair of second slits formed in upper and lower ends of the pressure locking body such that the first and second slits are open upwards and downwards, respectively, wherein the pressure locking body is provided with annular-shaped first and second pressure parts around upper and lower edges thereof.

In still another aspect, the support rod may be provided with threads formed around an outer circumferential surface thereof, a tapered shoulder part formed at a location above the threads, and a wedge part formed in a lower portion of the threads and having a tapered outer circumferential surface, the pressure locking body may be movably engaged with the threads of the support rod through screw-type engagement, and may be provided on a portion of the inner circumferential surface thereof having the first slits, with a first tapered seat part so as to correspond to the tapered shoulder part of the support rod, and may be provided on another portion of the inner circumferential surface thereof having the second slits with a second tapered seat part so as to be in contact with the tapered shoulder part of the wedge part.

In still another aspect, the locking mechanism for poles may further comprise: an elastic member provided on a lower end of the support rod.

The above and other objects, features and other advantages of the present invention will be more clearly understood from the following detailed description when taken in conjunction with the accompanying drawings. The technical terms and words used, both in the description and in the claims, must not be interpreted according to their dictionary meanings, but must be interpreted to have meanings or concepts pertinent to the scope and spirit of the invention, based on the principle by which the inventor can appropriately define the technical terms and words to explain the invention in the best way.

As described above, the locking mechanism for poles according to the present invention is advantageous in that it has two or more pressure parts spaced apart from each other in a longitudinal direction, thus realizing a multiple pressurizing structure and causing pressure to act on two or more points at the junction between the pressure locking body and a unit shaft, and increasing the locking strength between two locked unit shafts.

Further, in the present invention, the locking pressure of the pressure locking body is applied to a unit shaft at longitudinally spaced points, so that the locking strength of the locking mechanism can be dispersed or distributed in a longitudinal direction, and the resistance of the two locked unit shafts against compressive force or tensile force acting in a longitudinal direction can be increased, and the two locked unit shafts can be prevented from suddenly slipping toward each other.

BRIEF DESCRIPTION OF THE DRAWINGS

FIG. 1 is an exploded perspective view illustrating a locking mechanism for poles according to a first embodiment of the present invention;

FIG. 2 is a sectional view illustrating the assembled locking mechanism inserted into a unit shaft of a pole according to the first embodiment of the present invention;

FIG. 3 is a sectional view illustrating the locking operation of the locking mechanism according to the first embodiment of the present invention;

FIG. 4 is an exploded perspective view illustrating a locking mechanism for poles according to a second embodiment of the present invention;

FIG. 5 is a sectional view illustrating the assembled locking mechanism inserted into a unit shaft of a pole according to the second embodiment of the present invention;

FIG. 6 is a sectional view illustrating the locking operation of the locking mechanism according to the second embodiment of the present invention;

FIG. 7 is an exploded perspective view illustrating a locking mechanism for poles according to a third embodiment of the present invention;

FIG. 8 is a partially sectioned view of the assembled locking mechanism, taken along line A-A of FIG. 7;

FIG. 9 is a view taken along line A-A of FIG. 7, illustrating the locking operation of the locking mechanism;

FIG. 10 is a view taken along line B-B of FIG. 7, illustrating the locking operation of the locking mechanism;

FIG. 11 is an exploded perspective view illustrating a locking mechanism for poles according to a fourth embodiment of the present invention;

FIG. 12 is a partially sectioned view of the assembled locking mechanism taken along line C-C of FIG. 11;

FIG. 13 is a view taken along line C-C of FIG. 11, illustrating the locking operation of the locking mechanism; and FIG. 14 is a view taken along line D-D of FIG. 11, illustrating the locking operation of the locking mechanism.

DESCRIPTION OF REFERENCE CHARACTERS OF IMPORTANT PARTS

11: support rod 12: pressure locking body
13: retainer 17: elastic member
51, 52: unit shafts

DETAILED DESCRIPTION OF THE INVENTION

The above and other objects, features and other advantages of the present invention will be more clearly understood from the following detailed description when taken in conjunction with the accompanying drawings.

Hereinbelow, preferred embodiments of the present invention will be described with reference to the accompanying drawings.

In the following description, it is to be noted that, wherever possible, the same reference numerals will be used throughout the drawings and the description to refer to the same or like parts. Further, when the functions of conventional elements and the detailed description of elements related to the present invention may make the gist of the present invention unclear, a detailed description of those elements will be omitted.

FIG. 1 through FIG. 3 are views illustrating a locking mechanism for poles according to a first embodiment of the present invention. As shown in the drawings, the locking mechanism for poles according to the first embodiment of the present invention is interposed between a pair of unit shafts 51 and 52 so as to releasably lock the two unit shafts together and comprises a support rod 11 and a pressure locking unit.

The support rod 11 is movably inserted into a first unit shaft 51 at a first end thereof, and is fixed to a second unit shaft 52 at a second end thereof.

The support rod 11 is provided with threads 11a on part of the outer surface thereof.

The support rod 11 further comprises a tapered shoulder part 11c, which has a gradually reduced diameter and is formed on the upper end of the threads 11a, and a small-diameter tip part 11b, formed on the upper end of the tapered shoulder part 11c.

The pressure locking unit comprises a single pressure locking body 12 having at least one pair of main slits 12b. The pressure locking body 12 is preferably made of an elastic material, such as metal, rubber or plastic material. The pair of main slits 12b is longitudinally formed in the upper end of the pressure locking body 12 such that they are diametrically opposed to each other, and the pressure locking body 12 can be elastically opened in opposite directions around the pair of main slits 12b.

Further, one pair of sub-slits 12f is formed in the pressure locking body 12 at predetermined locations, which are angularly spaced apart from the pair of main slits 12b at right angles, such that the sub-slits 12f are diametrically opposed to each other. The sub-slits 12f are slit in a longitudinal direction opposite the slit direction of the main slits 12b, so that the sub-slits 12f promote the elastic opening action of the pressure locking body 12 around the main slits 12b.

Further, the pressure locking body 12 has threads 12g in the inner circumferential surface of one end thereof, so as to be movably engaged with the threads 11a of the support rod 11 through screw-type engagement. The upper end of the threads 12g of the pressure locking body 12 is provided with a tapered seat part 12a, which corresponds to the tapered shoulder part 11c of the support rod 11.

The pressure locking body 12 is provided on the upper edge thereof with an annular-shaped first pressure part 12c, which is formed through, for example, chamfering. An annular protrusion 12d is formed around the outer circumferential surface of the pressure locking body 12 at a location longitudinally spaced apart from the first pressure part 12c by a predetermined distance. A second pressure part 12e is formed around the corner of the annular protrusion 12d.

Further, as shown in FIG. 1, the pressure locking body 12 is provided on the lower end thereof with an elastic member 17. The elastic member 17 elastically biases the pressure locking body 12 in the longitudinal direction at the junction between the two locked unit shafts 51 and 52.

The elastic member 17 is supported at the upper end thereof by a retainer 13, and is supported at the lower end thereof on the upper end of the second unit shaft 52. The retainer 13 is provided with threads on the inner circumferential surface 13a thereof. The inner circumferential surface 13a, having the threads, is engaged with the lower end of the threads 11a of the support rod 11, thus fixing the retainer 13 to the support rod 11.

The assembly of the locking mechanism for poles according to the first embodiment of the present invention will be described in detail hereinbelow.

As shown in FIG. 2, the second unit shaft 52, having the support rod 11, is inserted into the first unit shaft 51 in the state in which the second end of the support rod 11 is locked to the second unit shaft 52. Thereafter, the second unit shaft 52 may be rotated while gripping the first unit shaft 51 with a hand, or the first unit shaft 51 may be rotated while gripping the second unit shaft 52. Due to the relative rotation of the two unit shafts 51 and 52, the threads 11a of the support rod 11 and the threads 12g of the pressure locking body 12 undergo screw movement relative to each other, so that the tapered shoulder part 11c of the support rod 11 is advanced along the tapered seat part 12a of the pressure locking body 12, as shown in FIG. 3, thus opening the pressure locking body 12 outwards in radial directions around the main slits 12b. Thus, both the first pressure part 12c and the second pressure part 12e of the pressure locking body 12 are pressed onto the inner circumferential surface of the first unit shaft 51 outwards in the radial directions, so that the pair of unit shafts 51 and 52 can be securely locked together.

Therefore, the present invention provides a multiple pressurizing structure using the first and second pressure parts 12c and 12e of the pressure locking body 12, thus realizing a structural advantage in which the pair of unit shafts 51 and 52 can be securely locked together.

Further, in the present invention, the pressure from the pressure locking body 12 is imposed on the inner circumferential surface of the unit shaft 51 at longitudinally spaced points, so that the locking strength, realized by the pressure locking body 12, is dispersed or distributed in a longitudinal direction. Thus, the present invention is advantageous in that the resistance of the two locked unit shafts 51 and 52 against both the compressive force and the tensile force, acting in longitudinal directions, can be increased, and the locked unit shafts 51 and 52 can be prevented from suddenly slipping toward each other.

In addition, when it is required to release or separate the two locked unit shafts 51 and 52 from each other, either unit shaft 51 or 52 is rotated in a direction opposite the direction of the above-mentioned locking process. Thus, the pressure locking body 12 executes screw movement relative to the threads 11b of the support rod 11 in the opposite direction, so that the opened pressure locking body 12 is closed around the main slits 12b and allows a user to easily release or separate the two locked unit shafts 51 and 52 from each other.

FIG. 4 and FIG. 5 illustrate a locking mechanism for poles according to a second embodiment of the present invention. As shown in FIGS. 4 and 5, the locking mechanism for poles according to the second embodiment of the present invention is interposed between two locked unit shafts 51 and 52, and comprises a support rod 11 and a pressure locking unit.

The support rod 11 is movably inserted at a first end thereof into the first unit shaft 51, and is fixed to the second unit shaft 52 at a second end thereof.

The support rod 11 is provided with first threads 11a on part of the outer surface thereof. The support rod 11 further comprises a tapered shoulder part 11c, which has a gradually reduced diameter and is formed on the upper end of the first threads 11a. A small-diameter tip part 11b, having a diameter smaller than that of the threads 11a, is formed on the upper end of the tapered shoulder part 11c, with second threads 11d formed around part of the small-diameter tip part 11b.

In the second embodiment, the pressure locking unit further comprises first and second pressure locking bodies 22 and 23, which are movably engaged with the support rod 11 through screw-type engagement.

The first pressure locking body 22 is preferably made of an elastic material, such as metal, rubber or plastic material. A pair of main slits 22b is longitudinally formed in the lower end of the first pressure locking body 22 such that they are diametrically opposed to each other, and the first pressure locking body 22 can be elastically opened in opposite directions around the pair of main slits 22b. Further, a mounting slot 22e is formed in the first pressure locking body 22 at a position above the main slits 22b, with a nut 25 fitted in the mounting slot 22e so as to be movably engaged with the second threads 11d of the support rod 11 through a screw-type engagement.

Further, one pair of sub-slits (not shown) is formed in the first pressure locking body 22 at predetermined locations, which are angularly spaced apart from the pair of main slits 22b at right angles, such that the sub-slits are diametrically opposed to each other. The sub-slits are slit in a longitudinal direction opposite the slit direction of the main slits 22b, so that the sub-slits promote the elastic opening action of the first pressure locking body 22 around the main slits 22b.

The first pressure locking body 22 is provided on the lower edge thereof with an annular-shaped first pressure part 22c, which is formed through, for example, chamfering. The first pressure locking body 22 is provided on the upper inner circumferential surface thereof with threads 22a so as to be movably engaged with the second threads 11d of the support rod 11 through screw-type engagement. A first tapered seat part 22d is provided in the first pressure locking body 22 at a location beneath the threads 22a so as to be in contact with and move relative to the outer circumferential surface of a wedge part 24, which will be described in detail later herein.

The wedge part 24 is a tapered body, the diameter of which is gradually reduced in an upward direction. The tapered outer circumferential surface of the wedge part 24 is in contact with the first tapered seat part 22d of the first pressure locking body 22. The lower surface of the wedge part 24 is supported by a washer 26, which is fastened to the lower end of the second threads 11d of the support rod 11.

In other words, when the first tapered seat part 22d of the first pressure locking body 22 is moved relative to the outer circumferential surface of the wedge part 24 while being in contact therewith, the first pressure locking body 22 is opened around the slits 22b, so that the first pressure part 22c is pressed onto the inner circumferential surface of the first unit shaft 51.

The second pressure locking body 23 is preferably made of an elastic material, such as metal, rubber or plastic material. A pair of main slits 23b is longitudinally formed in the upper end of the first pressure locking body 23 such that they are diametrically opposed to each other, and the second pressure locking body 23 can be elastically opened in opposite directions around the pair of main slits 23b.

Further, one pair of sub-slits 23f is formed in the second pressure locking body 23 at predetermined locations, which are angularly spaced apart from the pair of main slits 23b at right angles, such that the sub-slits 23f are diametrically opposed to each other. The sub-slits 23f are slit in a longitudinal direction, opposite the slit direction of the main slits 23b, so that the sub-slits 23f promote the elastic opening action of the second pressure locking body 23 around the main slits 23b.

The second pressure locking body 23 is provided on the inner circumferential surface thereof with threads 23g, so as to be movably engaged with the first threads 11a of the support rod 11. A second tapered seat part 23a is provided in the second pressure locking body 23 at a position above the threads 23g, so as to correspond to the tapered shoulder part 11c of the support rod 11.

The second pressure locking body 23 may be is provided on the upper edge thereof with an annular-shaped second pressure part 23c, which is formed through, for example, chamfering.

When the two unit shafts 51 and 52, having the locking mechanism according to the second embodiment, are rotated relative to each other in the same manner as that described for the first embodiment, the tapered shoulder part 11c of the support rod 11 moves longitudinally relative to the second tapered seat part 23a of the second pressure locking body 23 due to relative rotation between the threads 23g of the second pressure locking body 23 and the first threads 11b of the support rod 11. Thus, the second pressure locking body 23 is opened around the main slits 23a, so that the second pressure part 23c is pressed onto the inner circumferential surface of the first unit shaft 51, as shown in FIG. 6. In the above state, the first tapered seat part 22d of the first pressure locking body 22 moves relative to the tapered outer circumferential surface of the wedge part 24 while being in surface contact therewith, so that the first pressure locking body 22 is opened around the main slits 22b until the first pressure part 22c is pressed onto the inner circumferential surface of the first unit shaft 51. Thus, the two unit shafts 51 and 52 are locked together.

The construction and operation of the locking mechanism according to the second embodiment, except for the above-mentioned construction and operation, remain the same as those of the first embodiment, and further explanation is thus deemed unnecessary.

FIG. 7 through FIG. 9 illustrate a locking mechanism for poles according to a third embodiment of the present invention. As shown in FIGS. 7 through 9, the locking mechanism according to the third embodiment of the present invention is interposed between two locked unit shafts 51 and 52, and comprises a support rod 11 and a pressure locking unit.

The support rod 11 is movably inserted into a first unit shaft 51 at a first end thereof, and is fixed to a second unit shaft 52 at a second end thereof.

The support rod 11 is provided with threads 11a on part of the outer surface thereof. The support rod 11 further comprises a tapered shoulder part 11c, which has a gradually reduced diameter and is formed on the upper end of the threads 11a, and a small-diameter tip part 11b, formed on the upper end of the tapered shoulder part 11c.

The pressure locking unit according to the third embodiment comprises a pressure locking body 31, with a pair of first slits 31a and a pair of second slits 31b formed in opposite ends of the pressure locking body 31 so as to be open upwards and downwards, respectively.

In the present invention, the first and second slits 31a and 31b may be formed on the opposite ends of the pressure locking body 31 such that they are circumferentially offset from each other on the pressure locking body 31 (in FIG. 7, the first and second slits 31a and 31b are offset from each other so as to be perpendicular to each other).

Alternatively, the first and second slits 31a and 31b may be formed on the opposite ends of the pressure locking body 31 such that they are arranged in the same axial plane.

Further, each of the first and second pairs of slits 31a and 31b is formed on the pressure locking body 31 such that each pair of slits faces each other in the same manner as that described for the first and second embodiments.

The pressure locking body 31 according to the third embodiment may further comprise first and second sub-slits (not shown), which are formed on the pressure locking body 31 at locations angularly spaced apart from the first and second slits 31a and 31b at right angles. The first and second sub-slits (not shown) of the third embodiment may execute the same function as in the first and second embodiments.

As shown in FIG. 8, the pressure locking body 31 is provided, on the inner circumferential surface thereof in a predetermined portion having the first slits 31a, with a first tapered seat part 31c so as to correspond to the tapered shoulder part 11c of the support rod 11. Further, the first tapered seat part 31c is provided, on the lower inner circumferential surface thereof, with threads 31g so as to be movably engaged with the threads 11a of the support rod 11 through screw-type engagement.

As shown in FIG. 10, the pressure locking body 31 is also provided, on the inner circumferential surface thereof at another predetermined portion having the second slits 31b, with a second tapered seat part 31f, which is in contact with the tapered outer circumferential surface of the wedge part 34. Further, a mounting slot 31h is formed in the pressure locking body 31 at a position above the second slits 31b with a nut 35 fitted in the mounting slot 31h so as to be movably engaged with the threads 11a of the support rod 11 through screw-type engagement.

The lower end of the wedge part 34 may be supported by a washer 36, which is fastened to the threads 11a of the support rod 11.

Further, the pressure locking body 31 is provided on the upper and lower edges thereof with first and second annular-shaped pressure parts 31d and 31e, which are formed through, for example, chamfering.

When the pair of unit shafts 51 and 52 of the locking mechanism according to the third embodiment is rotated relative to each other in the same manner as those of the first and second embodiments, the threads 31g of the pressure locking body 31 and the threads 11a of the support rod 11 are rotated relative to each other, so that the upper portion of the pressure locking body 31 is opened around the first slits 31*a* due to relative movement between the first tapered seat part 31*c* of the pressure locking body 31 and the tapered shoulder part 11*c* of the support rod 11. Thus, the first pressure part 31*d* of the pressure locking body 31 is pressed onto a portion of the inner circumferential surface of the first unit shaft 51, as shown in FIG. 9. Further, the lower portion of the pressure locking body 31 is opened around the slot slits 31*b* due to relative movement between the second tapered seat part 31*f* and the wedge part 34. Thus, the second pressure part 31*e* of the pressure locking body 31 is pressed onto another portion of the inner circumferential surface of the first unit shaft 51, as shown in FIG. 10, thus securely locking the two unit shafts 51 and 52 to each other.

The construction and operation of the locking mechanism according to the third embodiment, except for the above-mentioned construction and operation, remain the same as those of the first and second embodiments, and further explanation is thus deemed unnecessary.

FIG. 11 through FIG. 14 illustrate a locking mechanism for poles according to a fourth embodiment of the present invention. As shown in FIGS. 11 through 14, the locking mechanism according to the fourth embodiment of the present invention is interposed between two locked unit shafts 51 and 52, and comprises a support rod 11 and a pressure locking unit.

The support rod 11 is movably inserted into a first unit shaft 51 at a first end thereof, and is fixed to a second unit shaft 52 at a second end thereof.

The support rod 11 is provided with threads 11*a* on part of the outer surface thereof. The support rod 11 further comprises a first tapered shoulder part 11*c*, which has an upwardly gradually reduced diameter and is formed on an upper end of the threads 11*a*, and a second tapered shoulder part 11*e*, which has a downwardly gradually increased diameter and is formed beneath the lower end of the threads 11*a*. The second tapered shoulder part 11*e* is externally threaded. Further, a small-diameter tip part 11*b* is formed on the upper end of the tapered shoulder part 11*c*.

The pressure locking unit according to the fourth embodiment comprises a single pressure locking body 42 having a first pair of slits 42*b* and a second pair of slits 42*f*.

The single pressure locking body 42 is preferably made of an elastic material, such as metal, rubber or plastic material. The pair of first slits 42*b* is longitudinally formed in the upper end of the pressure locking body 42 such that they are diametrically opposed to each other, and the pressure locking body 42 can be elastically opened in opposite directions around the pair of first slits 42*b*, as shown in FIG. 13.

Further, the pair of second slits 42*f* is open in a direction opposite the opening direction of the first slits 42*b*, and is angularly spaced apart from the first slits 42*b* at a right angle. The lower part of the pressure locking body 42 can be elastically opened in opposite directions around the second slits 42*f*, as shown in FIG. 14.

The pressure locking body 42 is provided on the first inner circumferential surface thereof with threads 42*g* so as to be movably engaged with the threads 11*a* of the support rod 11. A tapered seat part 42*a* is formed in the pressure locking body 42 at a position above the threads 42*g* so as to correspond to the first tapered shoulder part 11*c* of the support rod 11.

The pressure locking body 42 is provided on the upper edge thereof with an annular-shaped first pressure part 42*c*, which is formed through, for example, chamfering. An annular protrusion 42*d* is formed around the outer circumferential surface of the pressure locking body 42 at a position spaced apart from the first pressure part 42*c* by a predetermined distance. A second pressure part 42*e* is formed around an edge of the annular protrusion 42*d*.

Further, the lower edge of the pressure locking body 42 is provided with an annular-shaped third pressure part 42*k*. An annular-shaped fourth pressure part 42*j* is formed around the pressure locking body 42 at a position upwardly spaced apart from the third pressure part 42*k* by a predetermined distance.

The assembly of the locking mechanism for poles according to the fourth embodiment of the present invention will be described in detail hereinbelow.

The second unit shaft 52, having the support rod 11, is inserted into the first unit shaft 51, as shown in FIG. 12, in a state in which the second end of the support rod 11 is locked to the second unit shaft 52. Thereafter, the second unit shaft 52 may be rotated while gripping the first unit shaft 51 in the hand, or the first unit shaft 51 may be rotated while gripping the second unit shaft 52. Due to the relative rotation of the two unit shafts 51 and 52, the threads 11*a* of the support rod 11 and the threads 42*g* of the pressure locking body 42 undergo screw movement relative to each other.

Thus, the first tapered shoulder part 11*c* of the support rod 11 is advanced along the tapered seat part 42*a* of the pressure locking body 42, as shown in FIG. 13, thus opening the upper part of the pressure locking body 42 outwards in radial directions around the first slits 42*b*. Therefore, both the first pressure part 42*c* and the second pressure part 42*e* of the pressure locking body 42 are pressed onto the inner circumferential surface of the first unit shaft 51 outwards in radial directions.

In the same time, the second tapered shoulder part 11*e* of the support rod 11 is moved relative to the lower inner circumferential surface of the pressure locking body 42, as shown in FIG. 14, thus opening the lower part of the pressure locking body 42 in opposite directions around the second slits 42*f*. Therefore, the third and fourth pressure parts 42*k* and 42*j* of the pressure locking body 42 are pressed onto the inner circumferential surface of the first unit shaft 51 outwards in radial directions.

Briefly described, the locking mechanism for poles according to the fourth embodiment of the present invention is advantageous in that it can securely lock the two unit shafts 51 and 52 together using a multiple pressurizing structure, realized by the first through fourth pressure parts 42*c*, 42*e*, 42*k* and 42*j* of the pressure locking body 42.

As described above, the pressure locking body 12, 22, 23, 31, 42 according to the present invention comprises two or more pressure parts 12*c*, 12*e*, 22*c*, 23*c*, 31*d*, 31*e*, 42*c*, 42*e*, 42*k*, 42*j*, which are spaced apart from each other in a longitudinal direction, thus having a multiple pressurizing structure or a multiple contact support structure. Therefore, locking pressure or frictional contact locking force acts at the junction between the pressure locking body and the first unit shaft at two or more points, thus increasing the frictional force between the pressure locking body and the first unit shaft and increasing the locking strength between the two locked unit shafts 51 and 52.

Further, the present invention is advantageous in that the locking pressure of the pressure locking body is applied to a unit shaft at longitudinally spaced points, so that the locking strength of the locking mechanism can be dispersed or distributed in a longitudinal direction, and the resistance of the two locked unit shafts against compressive force or tensile force acting in a longitudinal direction can be increased, and the two locked unit shafts can be prevented from suddenly slipping toward each other.

Although the embodiments of the present invention have been disclosed for illustrative purposes, those skilled in the art will appreciate that various modifications, additions and substitutions are possible, without departing from the scope and spirit of the invention as disclosed in the accompanying claims.

The invention claimed is:

1. A locking mechanism for poles, comprising:
a support rod inserted into a first unit shaft at a first end thereof and locked to a second unit shaft at a second end thereof, with threads formed around part of an outer circumferential surface of the support rod; and
a pressure locking unit movably engaged with the threads of the support rod through screw-type engagement, with at least one pair of longitudinal slits formed in the pressure locking body such that the slits are open in one direction, and with two or more pressure parts formed in the pressure locking body in a longitudinal direction, wherein the pressure locking unit comprises:
a first pressure locking body having both at least one pair of slits and an annular-shaped first pressure part formed around an edge of the first pressure locking body; and
a second pressure locking body having both at least one pair of slits and an annular-shaped second pressure part formed around an edge of the second pressure locking body,
wherein the support rod comprises:
first threads formed around an outer circumferential surface of the support rod;
a tapered shoulder part formed around the support rod at a location above the first threads; and
second threads formed around the support rod at a location above the tapered shoulder part and having a diameter less than that of the first threads, wherein
the first pressure locking body is movably engaged with the second threads of the support rod through screw-type engagement, the support rod is provided on the second threads with a wedge part having a tapered outer circumferential surface, the first pressure locking body is provided on an inner circumferetial surface thereof with a first tapered seat part so as to correspond to the tapered outer circumferential surface of the wedge part, and
the second pressure locking body is movably engaged with the first threads of the support rod through a screw-type engagement, and is provided on an inner circumferential surface thereof with a second to tapered seat part so as to correspond to the tapered shoulder part of the support rod.

* * * * *